(12) United States Patent
Pfaeffle et al.

(10) Patent No.: US 6,698,396 B2
(45) Date of Patent: Mar. 2, 2004

(54) METHOD AND DEVICE FOR INJECTING FUEL IN AN INTERNAL COMBUSTION ENGINE

(75) Inventors: Andreas Pfaeffle, Wuestenrot (DE); Juergen Biester, Boeblingen (DE); Martin Grosser, Korntal-Muenchingen (DE); Peter Schubert, Leingarten (DE); Juergen Hammer, Fellbach (DE); Samuel McCaig, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/026,115

(22) Filed: Dec. 12, 2001

(65) Prior Publication Data

US 2002/0195082 A1 Dec. 26, 2002

(30) Foreign Application Priority Data

Dec. 22, 2000 (DE) .......................... 100 64 495

(51) Int. Cl.$^7$ ................................. F02B 3/00
(52) U.S. Cl. ..................... 123/299; 123/294
(58) Field of Search ................. 123/299, 294, 123/300, 301, 305

(56) References Cited

U.S. PATENT DOCUMENTS 5,402,760 A 4/1995 Takeuchi et al.
6,382,177 B1 * 5/2002 Saito .......................... 123/299
6,491,016 B1 * 12/2002 Buratti ........................ 123/299
6,491,018 B1 * 12/2002 Duffy et al. ................. 123/299

FOREIGN PATENT DOCUMENTS

DE    198 60 398    7/2000

* cited by examiner

*Primary Examiner*—Bibhu Mohanty
(74) *Attorney, Agent, or Firm*—Kenyon & Kenyon (57) ABSTRACT

The present invention relates to a device and a method for dividing up a total fuel amount, which is to be injected into the combustion chamber of a cylinder during a combustion cycle, into a plurality of injections. To this end, a first fuel amount, which is to be injected during a first injection is determined, a fourth, minimum fuel amount for a third injection is determined, and the total fuel amount minus the first fuel amount is compared to the fourth, minimum fuel amount. When the total fuel amount minus the first fuel amount is greater than or equal to the fourth, minimum fuel amount, the first fuel amount and a second fuel amount, which is to be injected into the combustion chamber of the cylinder during a second injection, are set to zero, and a third fuel amount, which is to be injected during a third injection, is set to the total fuel amount.

10 Claims, 4 Drawing Sheets

METHOD AND DEVICE FOR INJECTING FUEL IN AN INTERNAL COMBUSTION ENGINE

The present invention relates to a method and a device for dividing up a total amount of fuel, which is to be injected into a combustion chamber of a cylinder during a combustion cycle, into a plurality of injections, as well as a method and a device for dividing up a total amount of fuel, which is to be injected into a combustion chamber of a cylinder during a combustion cycle and includes a first amount of fuel, a second amount of fuel, and a third amount of fuel, into a first injection, a second injection, and a third injection of the combustion cycle of the cylinder.

In common-rail injection systems for internal combustion engines, a high-pressure pump is used to build up a pressure of up to 2000 bar in a pressure chamber, which contains the fuel to be injected and is referred to as the common rail. The common rail is connected to all of the injection devices of all engine cylinders. Metering valves, usually solenoid valves or piezoelectric systems, are used as injection devices, through which fuel is injected into the combustion chamber of the cylinder, when they are in the open state.

In contrast to direct-injection systems, in which a pressure must be built up anew for each combustion cycle or injection cycle of each cylinder, the pressure in the common rail of the common-rail injection system remains in a constant range, regardless of the combustion sequence.

Since this high-pressure is applied to all of the solenoid valves of all engine cylinders, the fuel can therefore be injected into the combustion chambers of the cylinders, by controlling the opening of the respective solenoid valve in a simple manner, i.e. by controlling a lift, an opening and/or closing time, and an opening and/or closing speed of the solenoid valve.

However, the high pressure in the combustion chamber, up to 160 bar, and the speed at which the pressure increases during combustion cause these direct-injection systems and common-rail injection systems to be very loud.

In order to reduce the noise emissions, pre-injection is implemented in common-rail systems. In this context, a small amount of fuel is injected into the combustion chamber of the cylinder and ignited up to a few milliseconds prior to the main injection. This preheats the combustion chamber and creates improved conditions in the combustion chamber for the main combustion during the main injection.

In this regard, DE 198 60 398 proposes the implementation of a pre-injection, a main injection, and/or a post-injection, which can be divided up into a plurality of pre-injections, main injections, and/or post-injections, respectively.

U.S. Pat. No. 5,402,760 describes a fuel-injection control device, which provides various control-current waveforms for a solenoid valve, in order to minimize the effects of residual magnetic flux in this valve.

However, the mutual dependence of the injection amount and the injection times causes the individual injections of a combustion cycle in the described injection systems to affect each other. This can result, for example, in injection amounts not adjusted to each other being injected in the respective injection occurrences of a combustion cycle, or in control starting points not adapted to the specific injection amounts being used for the individual injection occurrences. This results in irregular combustion, along with unacceptable pressure gradients in the engine, which in turn lead to an increase in the noise and pollutant emissions.

The present invention is based on the problem of reducing noise emissions and pollutant emissions of the internal combustion engine.

This problem is solved by the features specified in claims 1, and 7, 12, and 13.

The advantages attained by the features listed in claim 1 include, in particular, that the amount of fuel for the last of the three injections of a combustion cycle does not fall below a minimum value. In this manner, it is ensured that, during the third injection of the combustion, sufficient fuel is supplied for satisfactory combustion, and therefore, a sudden drop in the combustion intensity due to insufficient fuel supply is prevented in the third injection. This advantageously prevents a sudden fall in the magnitude of the torque of the cylinder in relation to the total torque of the internal combustion engine. Consequently, a smoother characteristic curve of the pressure gradient in the engine, i.e. a characteristic not having, for example, a sharp fall, is attained. This ensures reduced noise and pollutant emissions.

An advantageous refinement of the present invention is specified in claim 2. The refinement according to claim 2 advantageously allows the fuel amount to be exactly determined, since the third fuel amount is calculated by subtracting the ascertained, first fuel amount, which is to be injected into the combustion chamber of the cylinder during a first injection of the combustion cycle, from the total fuel amount that is to be injected into the combustion chamber of the cylinder during a combustion cycle. Since the third fuel amount is calculated by simple subtraction, this refinement allows the computational time for the individual fuel amounts to be minimized.

A further advantageous refinement of the present invention according to claim 1 is specified in claim 3. The refinement according to claim 3 advantageously prevents a double calculation of the fuel amounts, since the total fuel amount is initially calculated, then the first fuel amount, then a second fuel amount that is to be injected into the combustion chamber of the cylinder during a second injection of the combustion cycle, and then the third fuel amount is calculated as a function of the three previously determined quantities. Therefore, the first injection has priority over the second injection.

The advantages attained by the features of claim 7 include, in particular, that the first position for the first injection and the second position for the second injection are checked in light of first limiting values and second limiting values, before the injections are carried out. This ensures that the injections are executed in the correct position, so that the individual injection occurrences do not mutually affect each other in a disadvantageous manner.

Further advantageous developments of the present invention ensue from the dependent claims.

Exemplary embodiments of the present invention are described below with reference to the accompanying drawings. The figures show.

An exemplary embodiment of the present invention is described below, using a common-rail injection system having a solenoid injection device as an example, where a first pre-injection VE1, a second pre-injection VE2, and a main injection HE are executed in this order in a combustion cycle. In a four-stroke engine, a cycle, which includes an intake stroke, a compression stroke, a power stroke, and an exhaust stroke of a cylinder, is designated as combustion cycle Z1.

However, the present invention can also be applied to other injection systems, such as systems controlled by solenoid valves, pump-nozzle systems (PDE), pump power-nozzle systems (PLD), distributor-pump systems (VP), or corresponding systems having piezoelectric actuators, where a plurality of injection occurrences are provided in a combustion cycle. In addition, the present invention can also be applied to two-stroke engines, six-stroke engines, or engines having more strokes, as well as to diesel engines or gasoline engines.

Figure 1:
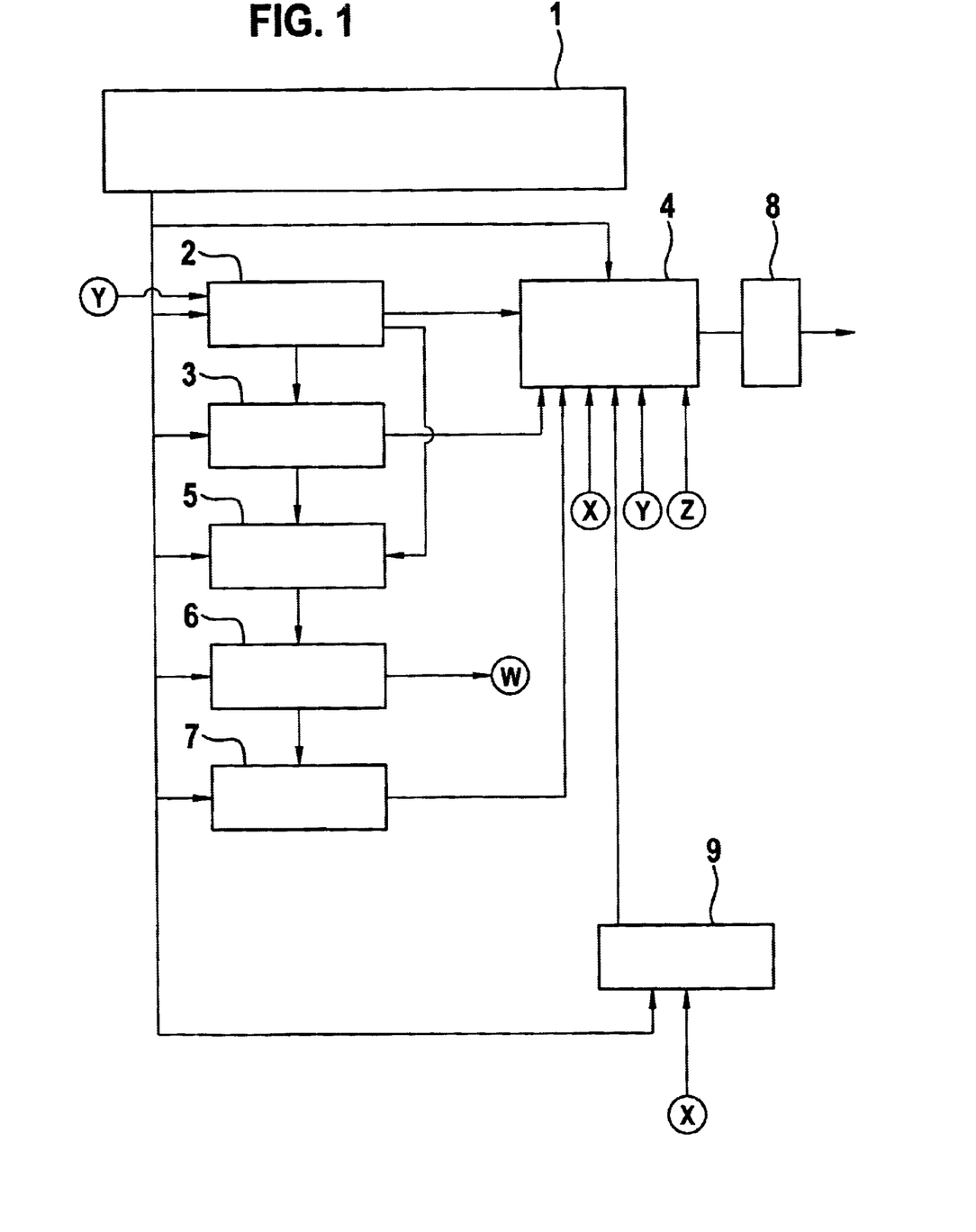
FIGS. 1 and 2 an exemplary embodiment of the present invention.

FIG. 1 shows an exemplary embodiment of the present invention. Reference numeral 1 denotes a fuel-amount determination device, which is used to determine a total fuel amount VG that is to be injected into the combustion chamber of the cylinder during combustion cycle Z1, a first fuel amount VE1 for first pre-injection E1, a second fuel amount VE2 for second pre-injection E2, and a fourth, minimum fuel amount VHEmin that may not be undershot during main injection HE of combustion cycle Z1, into the combustion chamber of the cylinder. Fuel-amount determination device 1 includes a look-up table or a look-up characteristics map, from which the appropriate fuel amounts VG, VE1, VE2, and VHEmin can be read off as a function of state variables or controlled variables, such as a setting of a power control device. When the internal combustion engine is situated in a vehicle, the power control device is preferably in the form of an accelerator pedal. Instead of or in addition to the setting of the power control device, fuel-amount determination device 1 can also consider additional state variables or controlled variables of the engine, such as an engine speed, a load change, an engine temperature, etc.

Furthermore, fuel-amount determination device 1 can be provided with a calculation device, which continuously calculates fuel amounts VG, VE1, VE2, and VHEmin, using various state variables or controlled variables of the internal combustion engine, such as a torque demand, an engine speed, etc.

Fuel-amount determination device 1 is connected to a first subtracter circuit 2, a first comparator 3, an output device 4, a second subtracter circuit 5, a second comparator 6, a third subtracter circuit 7, and a fourth subtracter circuit 9, and outputs the ascertained fuel amounts, i.e. signals corresponding to these fuel amounts, to these attached devices.

Figure 2:
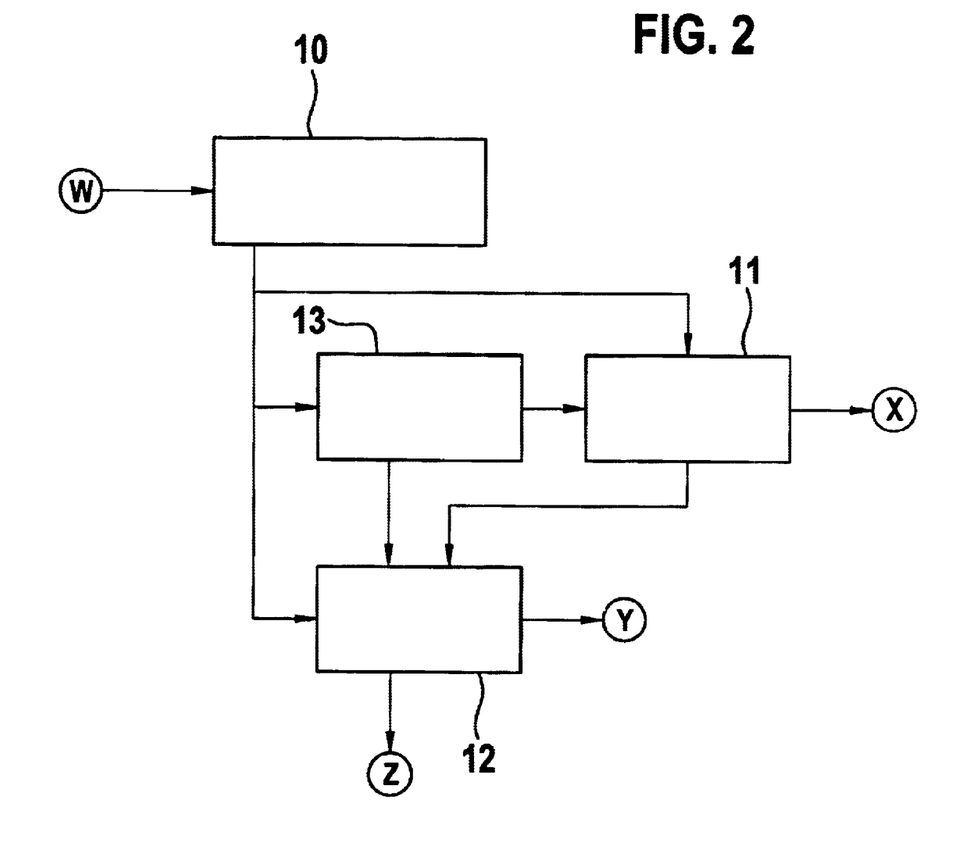

First subtracter circuit 2 is connected to fuel-amount determination device 1, first comparator 3, second subtracter circuit 5, output device 4, and a position-determination device 10 that is represented in FIG. 2. In FIGS. 1 and 2, the connection between first subtracter circuit 2 and position-determination device 10 is represented by a Y in a circle. First subtracter circuit 2 subtracts the first fuel amount VE1 for first pre-injection E1 ascertained by fuel-amount determination device 1, from total fuel amount VG, which is also ascertained by fuel-amount determination device 1. The subtraction result is referred to as V1. First subtracter circuit 2 outputs subtraction result V1 to first comparator 3, to output device 4, and to second subtracter circuit 5.

First comparator 3 is additionally connected to output device 4 and second subtracter circuit 5. First comparator 3 compares subtraction result V1 to the minimum fuel amount VHEmin for main injection HE ascertained by fuel-amount determination device 1. This minimum fuel amount VHEmin may not be undershot during main injection HE.

When subtraction result V1 is less than or equal to minimum fuel amount VHEmin, the first comparator outputs an appropriate signal to output device 4.

When subtraction result V1 is greater than minimum fuel amount VHEmin, first comparator 3 outputs a corresponding signal to second subtracter circuit 5.

Second subtracter circuit 5 is further connected to second comparator 6. Second subtracter circuit 5 subtracts the fuel amount VE2 for second pre-injection E2 ascertained by fuel-amount determination device 1, from subtraction result V1 of first subtracter circuit 2. The subtraction result of second subtracter circuit 5 is referred to as V2. Second subtracter circuit 5 outputs subtraction result V2 to second comparator 6.

Second comparator 6 is also connected to third subtracter circuit 7 and to a position-determination device 10 that is represented in FIG. 2. When subtraction result V2 of second subtracter circuit 5 is greater than minimum fuel amount VHEmin for main injection HE, second comparator 6 outputs an appropriate signal denoted by a W in a circle in FIGS. 1 and 2, to position-determination device 10, which is represented in FIG. 2.

When subtraction result V2 of second subtracter circuit 5 is less than or equal to minimum fuel amount VHEmin for main injection HE, second comparator 6 outputs a corresponding signal to third subtracter circuit 7.

Third subtracter circuit 7 is additionally connected to output device 4. Third subtracter circuit 7 subtracts first fuel amount VE1 ascertained by fuel-amount determination device 1, from total fuel amount VG likewise ascertained by fuel-amount determination device 1, and outputs the subtraction result to output device 4.

Fourth subtracter circuit 9 is further connected to output device 4. Fourth subtracter circuit 9 subtracts the fuel amount VE1 for first pre-injection VE1 ascertained by fuel-amount determination device 1, and the fuel amount VE2 for second pre-injection E2 ascertained by fuel-amount determination device 1, from total fuel amount VG ascertained by fuel-amount determination device 1. The subtraction result is output to output device 4.

Output device 4 is further connected to a smooth-running regulator correction device 8, a fourth comparator 11, and a fifth comparator 12, which are represented in FIG. 2.

Smooth-running regulator correction device 8 is designed to correct the signal output by output device 4 to the solenoid valve, with regard to better running smoothness of the engine. To this end, smooth-running regulator correction device 8 determines if low-frequency vibrations are present in the internal combustion engine. Depending on the presence of low-frequency vibrations in the engine, smooth-running regulator correction device 8 changes the signal to the solenoid valve in such a manner, that fuel amount VE1 to be injected during first injection E1 is increased or decreased by a preset amount ΔV, and corrected, first fuel amount VE1' is injected. Therefore, the specific torque contribution of the cylinder is changed in relation to the total torque of the engine and, therefore, artificially creates an imbalance in the running of the engine, which compensates for low-frequency vibrations. Although smooth-running regulator correction device 8 is provided in this exemplary embodiment, the present invention can be applied in the same manner to an injection system not having smooth-running regulator correction device 8.

The position-determination device 10 represented in FIG. 2 is also connected to a third comparator 13, fourth comparator 11, and fifth comparator 12. Position-determination device 10 calculates a control start ABVE1 for the solenoid valve for the first pre-injection, a corrected control start AB'VE1 for the first pre-injection, and a control start ABVE2 for the second pre-injection. Position-determination device 10 preferably calculates corresponding control starts ABVE1, AB'VE1, and ABVE2 as times, on the basis of the state variables and/or controlled variables of the internal combustion engine. Fuel-amount determination device 10 includes a look-up table or a look-up characteristics map, from which the appropriate control starts ABVE1, AB'VE1, and ABVE2 can be read off as a function of state variables or controlled variables, such as a setting of the power control device.

Third comparator 13 is connected to fourth comparator 11 and fifth comparator 12. Third comparator 13 compares the control start ABVE1 for first pre-injection E1 ascertained by position-determination device 10, to first limiting values $[t_1; t_2]$. When control start ABVE1 for first pre-injection E1 is within first limiting values $[t_1; t_2]$, then third comparator 13 outputs a corresponding signal to fourth comparator 11. When the control start for first pre-injection ABVE1 is not within first limiting values $[t_1; t_2]$, third comparator 13 outputs a corresponding output signal to fifth comparator 12.

Fourth comparator 11 is connected to fourth subtracter circuit 9, fifth comparator 12, and output device 4. Fourth comparator 11 compares the control start ABVE2 for second pre-injection E2 ascertained by position-determination device 10, to second limiting values $[t_3; t_4]$. When the control start for second pre-injection ABVE2 is within second limiting values $[t_3; t_4]$, fourth comparator 11 outputs an output signal, which is indicated in FIGS. 1 and 2 by an X in a circle, to fourth subtracter circuit 9 and output device 4. When the control start for second pre-injection ABVE2 is not within second limiting values $[t_3; t_4]$, fourth comparator 11 outputs a corresponding signal to fifth comparator 12.

Fifth comparator 12 is further connected to first subtracter circuit 2 and output device 4. Fifth comparator 12 compares the corrected control start AB'VE1 for first pre-injection E1 ascertained by position-determination device 10, to third limiting values $[t_{1'}; t_{2'}]$. When corrected control start AB'VE1 for first pre-injection E1 is within third limiting values $[t_{1'}; t_{2'}]$, fifth comparator 12 outputs a corresponding output signal, which is indicated in FIGS. 1 and 2 by a Y in a circle, to first subtracter circuit 2 and output device 4. When corrected control start AB'VE1 of first pre-injection E1 is not within third limiting values $[t_{1'}; t_{2'}]$, fifth comparator 12 outputs an output signal, which is indicated in FIGS. 1 and 2 by a Z in a circle, to output device 4.

Output device 4 is designed such that, in response to the output signal of first comparator 3 being received, it outputs an output signal in the form of a trigger signal for the solenoid injection valve, in such a manner, that total fuel amount VG is injected into the combustion chamber of the cylinder during main injection HE, and no fuel is injected during first injection E1 and second injection E2. Therefore, output device 4 sets fuel amount VE1 for first pre-injection E1 to 0, sets fuel amount VE2 for second pre-injection E2 to 0, and sets fuel amount VHE for main injection HE equal to total fuel amount VG ascertained by fuel-amount determination device 1.

Output device 4 is also designed such that, in response to the arrival of the output signal of third subtracter circuit 7, it outputs an output signal to the solenoid valve in such a manner that, assuming smooth-running regulator correction device 8 is not carrying out a smooth-running regulator correction, fuel amount VE1 ascertained by fuel-amount determination device 1 is injected during first pre-injection E1, and the difference calculated by third subtracter circuit 7, of the fuel amount VE1 for first pre-injection E1 calculated by fuel-amount determination device 1 and total fuel amount VG ascertained by fuel-amount determination device 1 is injected during main injection HE, while no fuel is injected during second injection E3. Therefore, output device 4 sets fuel amount VE2 for second pre-injection E2 to zero, while fuel amount VE1 is set for first pre-injection E1, and the difference VG−VE1 is set for main injection HE.

Output device 4 is also designed such that, upon arrival of the output signal of fourth comparator 11, the output device outputs signals to the solenoid valve in such a manner that, assuming smooth-running regulator correction device 8 is not carrying out a smooth-running regulator correction, the fuel amount VE1 for the first pre-injection ascertained by fuel-amount determination device 1 is injected during first pre-injection E1, the fuel amount VE2 for second pre-injection E2 ascertained by fuel-amount determination device 1 is injected during second pre-injection E2, and the difference calculated by fourth subtracter circuit 9, of the fuel amount VE1 for first pre-injection E1 ascertained by fuel-amount determination device 1 and the fuel amount VE2 for second injection E2 ascertained by fuel-amount determination device 1, from total fuel amount VG ascertained by fuel-amount determination device 1, is injected during main injection HE.

In addition, output device 4 is designed such that, upon arrival of the output signal of fifth comparator 12, the output device sets fuel amount VE2 for second pre-injection E2 to 0 and outputs an output signal in such a manner that, assuming smooth-running regulator correction device 8 is not carrying out a smooth-running regulator correction, the solenoid valve is opened such that the fuel amount VE1 for the first pre-injection ascertained by fuel-amount determination device 1 is injected during first pre-injection E1, and, during main injection HE, a fuel amount VHE is injected, which corresponds to the difference calculated by first subtracter circuit 2, of the fuel amount VE1 for the first pre-injection ascertained by fuel-amount determination device 1, and total fuel amount VG ascertained by fuel-amount determination device 1.

Output device 4 is also designed such that, in response to the arrival of output signal of fifth comparator 12, which is indicated in FIGS. 1 and 2 by a Z in a circle, the output device sets fuel amount VE1 for first pre-injection E1 and fuel amount VE2 for second pre-injection E2 to 0 and outputs an output signal to the solenoid valve in such a manner, that a fuel amount VHE corresponding to total fuel amount VG ascertained by fuel-amount determination device 1 is injected during main injection HE.

The device shown in FIGS. 1 and 2 is preferably situated in an engine control unit.

An exemplary embodiment of the functioning method of the device represented in FIGS. 1 and 2 is described below with reference to FIGS. 3 and 4. FIG. 4 is a continuation of FIG. 3 and follows the point (A).

In step S1, fuel-amount determination device 1 calculates the total fuel amount VG, which is to be injected into the combustion chamber of the cylinder during a combustion cycle Z1. In the next step S2, fuel-amount determination device 1 ascertains the fuel amount VE1, which is to be injected into the combustion chamber of the cylinder during first injection E1 of combustion cycle Z1. The processing is then continued in step S3.

In step S3, fuel-amount determination device 1 determines the minimum fuel amount VHEmin that may not be undershot during main injection HE, which is temporally positioned after first pre-injection E1 and second pre-injection E2. The processing is then continued in step S4.

In step S4, first subtracter circuit 2 subtracts fuel amount VE1 for first pre-injection A1, from total fuel amount VG, in order to thus obtain subtraction result V1. In the subsequent step S5, first comparator 3 compares subtraction result V1 to minimum fuel amount VHEmin for main injection HE. When subtraction result V1, which represents the difference of fuel amount VE1 for first injection E1 and total fuel amount VG, is less than or equal to minimum fuel amount VHEmin of main injection HE, then the processing is continued in step S6.

In step S6, first comparator 3 outputs a signal to output device 4. As a result, output device 4 sets fuel amount VE1 for first pre-injection E1 and fuel amount VE2 for second pre-injection E2 to 0, and outputs an output signal to the solenoid valve in such a manner, that a fuel amount corresponding to total fuel amount VG ascertained by fuel-amount determination device 1 is injected during main injection HE. No fuel is injected during first pre-injection E1 and second pre-injection E2. In the present exemplary embodiment, the position of main injection HE is selected by an engine control unit not shown. The position of main injection HE is understood as the time of the opening and closing of the solenoid valve. When the times of the opening and closing of the solenoid valve are preselected as in the case of the present exemplary embodiment, the output device sets the fuel amount to be injected by controlling the lift of the solenoid valve and/or the opening speed and/or closing speed of the solenoid valve. However, when a variant of the present exemplary embodiment only provides for, e.g. the opening time of the solenoid valve being selected by the control unit of the engine, output device 4 can be designed to also control the fuel amount to be injected, using the length of the opening window of the solenoid valve, i.e. using the period of time between the opening and the closing of the solenoid valve.

When first comparator 3 establishes in step S5, that subtraction result V1 is greater than the minimum fuel amount VHEmin for main injection HE, then the processing is continued in step S7, in which fuel-amount determination device 1 ascertains fuel amount VE2 for second pre-injection E2. The processing is then continued in step S8.

In step S8, second subtracter circuit 5 subtracts fuel amount VE2 for second pre-injection E2 from subtraction result V1 calculated in step S4. The subtraction result from step S8 is designated as V2. The processing is then continued in step S9.

In step S9, second comparator 6 compares subtraction result V2 from step S8 to the minimum fuel amount VHEmin for main injection HE ascertained in step S3. When second comparator 6 determines in step S9, that subtraction result V2 calculated in step S8 is greater than the minimum fuel amount VHEmin of main injection HE ascertained in step S3, then the processing is continued in step S10.

In step S10, second comparator 6 outputs an output signal to third subtracter circuit 7, whereupon third subtracter circuit 7 subtracts the fuel amount VE1 for first pre-injection E1 determined in step S2, from total fuel amount VG determined in step S1. The subtraction result is designated as VHE. Third subtracter circuit 7 then outputs an output signal to output device 4, the output signal indicating subtraction result VHE. The processing is then continued in step S1.

In step S1, output device 4 sets fuel amount VE2 for second pre-injection E2 to 0 in response to the output signal of third subtracter circuit 7. Output device 4 then outputs an output signal so that fuel amount VE1 is injected during first pre-injection E1, when position-controller correction device 8 is not carrying out a position-controller correction, and a fuel amount corresponding to subtraction result VHE calculated in step S10 is injected during main injection HE. The processing is then continued in step S12.

In step S12, smooth-running regulator correction device 8 corrects the output signal of the output device 4 output to the solenoid valve, as a function of the presence of low-frequency vibrations in the internal combustion engine, in such a manner, that fuel amount VE1 for first pre-injection E1 is increased or decreased by the value $\Delta V$, and corrected fuel amount VE1' is injected during first pre-injection E1.

If second comparator 6 determines, in step S9, that subtraction result V2 from step S8 is greater than minimum fuel amount VHEmin ascertained in step S3, then the processing is continued in step S13 in FIG. 4.

In step S13, second comparator 6 outputs an output signal, which is denoted by a W in a circle in FIGS. 1 and 2, to position-determination device 10, whereupon position-determination device 10 determines control start ABVE1 for first pre-injection E1. The control start is preferably a time $t_x$, which indicates the beginning of current flow through the solenoid valve.

The position of control start ABVE1 for first pre-injection E1, corrected control start AB'VE1 for first pre-injection A1, and control start ABVE2 for second pre-injection E2 are determined in position-determination device 10, using a look-up table or a look-up characteristics map, as a function of at least the setting of the power control device. Is also possible to consider additional influence factors, such as the engine temperature, a driving style, the load condition, or a preselected emissions value, in the look-up table or the look-up characteristics map.

In a variant of this exemplary embodiment, position-determination device 10 is a computation device, which continuously calculates the control starts for first pre-injection E1 and for second pre-injection E2, using at least the setting of the power control device.

In step S14, which follows step 13, third comparator 13 compares the control start ABVE1 for first pre-injection E1 determined in step S13 to first limiting values $[t_1; t_2]$. When control start ABVE1 for first pre-injection E1 is within first limiting values $[t_1; t_2]$, then third comparator 13 outputs a corresponding output signal to fourth comparator 11. The processing in FIG. 4 is then continued in step S15.

In step S15, position-determination device 10 determines a control start ABVE2 for second pre-injection VE2. This occurs in the same manner as for first pre-injection E1. Position-determination device 10 outputs the calculated control start ABVE2 for the second pre-injection to the fourth comparator. The processing is then continued in step S16.

In step S16, fourth comparator 11 compares control start ABVE2 for second pre-injection E2 to second limiting values $[t_3; t_4]$. When control start ABVE2 for second pre-injection E2 is within second limiting values $[t_3; t_4]$, then the processing is continued in step S17, in which fourth comparator 11 outputs the one output signal indicated by an X in a circle in FIGS. 1 and 2 to output device 4 and to fourth subtracter circuit 9. In step S17, fourth subtracter circuit 9 subsequently subtracts fuel amount VE1 for first pre-injection E1, which was determined in step S2, and fuel amount VE2 for second pre-injection E2, which was determined in step S7, from total fuel amount VG determined in step S1. Fourth subtracter circuit 9 outputs subtraction result VHE, which denotes the fuel amount to be injected into the cylinder during main injection HE, to output device 4. The processing is then continued in step S18.

In step S18, output device 4 outputs an output signal to the solenoid valve in response to the output signal from fourth comparator 11, such that a fuel amount corresponding to first fuel amount VE1 is injected during first pre-injection E1, a fuel amount corresponding to fuel amount VE2 ascertained in step S7 is injected during second pre-injection E2, and a fuel amount corresponding to fuel amount VHE ascertained in step S16 is injected during main injection HE. Output device 4 controls the solenoid valve in such manner, that the solenoid valve is opened at times ABVE1 for first pre-injection E1 and ABVE2 for second pre-injection E2, and at the position of main injection HE predetermined by the control unit of the engine. The output device also controls the amount of injected fuel by controlling the opening window of the solenoid valve and/or the opening lift of the solenoid valve and/or the opening and/or closing speed of the solenoid valve. The processing is then continued in step S19.

In step S19, smooth-running regulator correction device 8 corrects the output signal of output device 4 output to the solenoid valve, in such manner, that corrected fuel amount VE1' is injected during first pre-injection E1, as in step S12.

When third comparator 13 determines in step 14, that control start ABVE1 of first pre-injection E1 is not within first limiting values $[t_1; t_2]$, or fourth comparator 11 determines in step S16 that control start ABVE2 of second pre-injection E2 is not within second permissible limiting values $[t_3; t_4]$, then the processing in FIG. 4 is continued in step S20.

In step S20, position-determination device 10 ascertains a new control start AB'VE1 for first pre-injection E1. To this end, position-determination device 10 adds a predetermined correction value Δt to the control start ABVE1 for first pre-injection E1 ascertained in step S13. The processing is then continued in step S21.

In step S21, fifth comparator 12 compares corrected control start AB'VE1 ascertained in step S19 to third limiting values $[t_1'; t_2']$. First, second, and third limiting values $[t_1; t_2], [t_3; t_4]$, and $[t_1'; t_2']$ are preset values. In a variant of this exemplary embodiment, it is possible, however, to adjust these values, using different characteristic quantities such as the speed or the temperature of the internal combustion engine.

When corrected control start AB'VE1 in step S21 is within third limiting values $[t_1'; t_2']$, then the processing is continued in step S22. In step S22, fifth comparator 12 outputs the output signal, which is designated in FIGS. 1 and 2 by a Y in a circle, to first subtracter circuit 2 and output device 4. In response to the output signal of fifth comparator 12, first subtracter circuit 2 outputs subtraction result V1 to output device 4. The processing is then continued in step S23.

In step S23, output device 4 sets fuel amount VE2 for second pre-injection E2 to 0 in response to the output signal of fifth comparator 12, and outputs an output signal to the solenoid valve, such that a fuel amount corresponding to first fuel amount VE1 is injected during first pre-injection E1 when no smooth-running regulator correction is carried out, no fuel is injected during second pre-injection E2, and a fuel amount corresponding to subtraction result V1 of step S4 is injected during main injection HE, the subtraction result corresponding to the difference of total fuel amount VG calculated in step S1 and the fuel amount VE1 of first injection E1 determined in step S2. Output device 4 controls the solenoid valve in such manner, that the solenoid valve is opened at time AB'VE1 for first pre-injection E1, and at the position of main injection HE predetermined by the control unit of the engine. The output device also controls the amount of injected fuel by controlling the opening window of the solenoid valve and/or the opening lift of the solenoid valve and/or the opening and/or closing speed of the solenoid valve.

When fifth comparator 12 determines in step S21, that corrected control start AB'VE1 of first pre-injection E2 is outside third limiting values $[t_1'; t_2']$, then the processing is continued in step S25. In step S25, fifth comparator 12 outputs an output signal, which is denoted in FIGS. 1 and 2 by a Z in a circle, to output device 4. In step S25, as in step S6, output device 4 consequently sets fuel amount VE1 for first pre-injection E1 and fuel amount VE2 for second pre-injection E2 to 0, and outputs an output signal to the solenoid valve, such that no fuel is injected during first pre-injection E1 and second pre-injection E2, and, during main injection HE, a fuel amount is injected, which corresponds to total fuel amount VG ascertained in step S1 by fuel-amount determination device 1.

Figure 3:
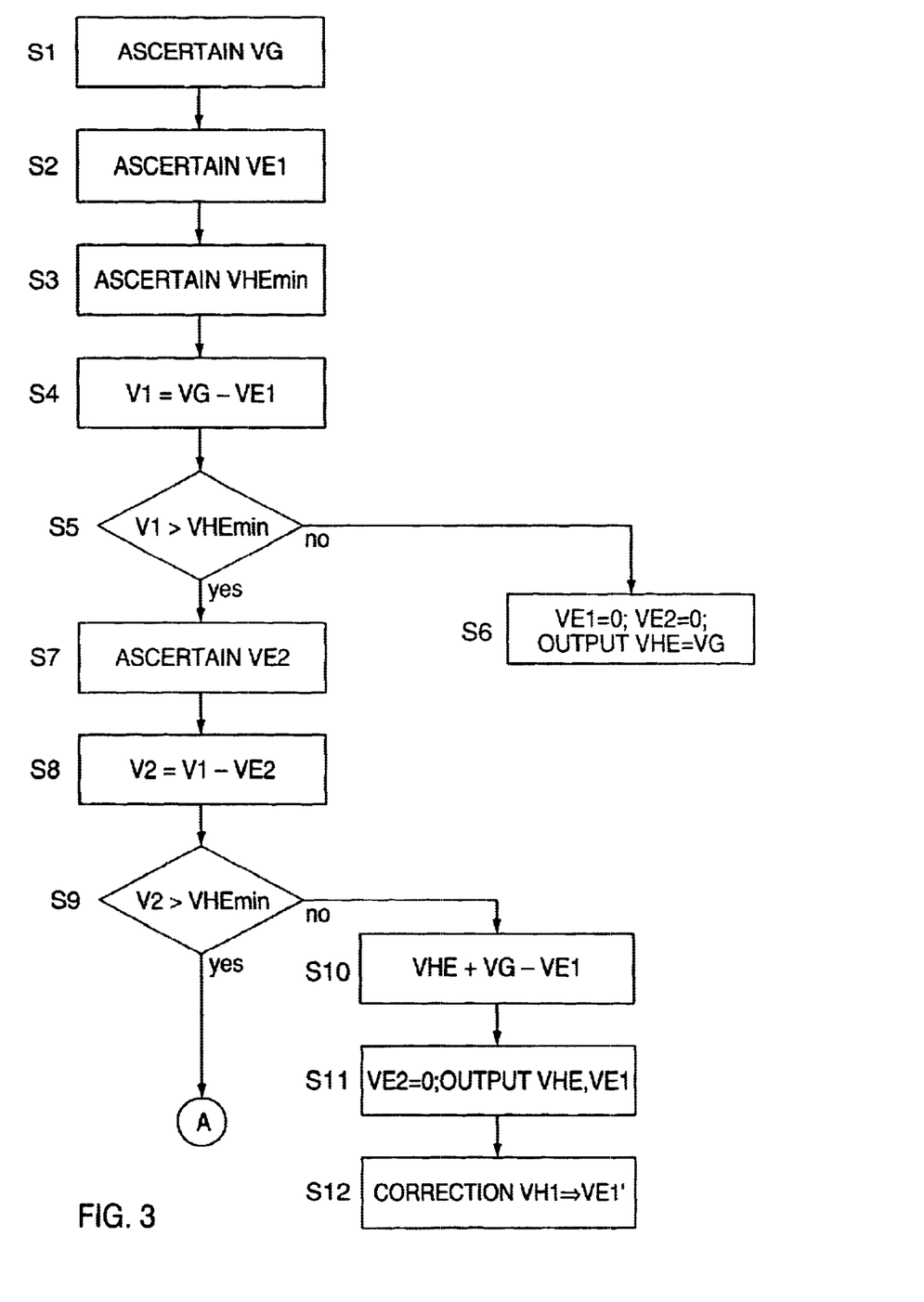
FIGS. 3 and 4 an exemplary embodiment of a functioning method for the exemplary embodiment of the present invention shown in FIGS. 1 and 2.
Figure 4:
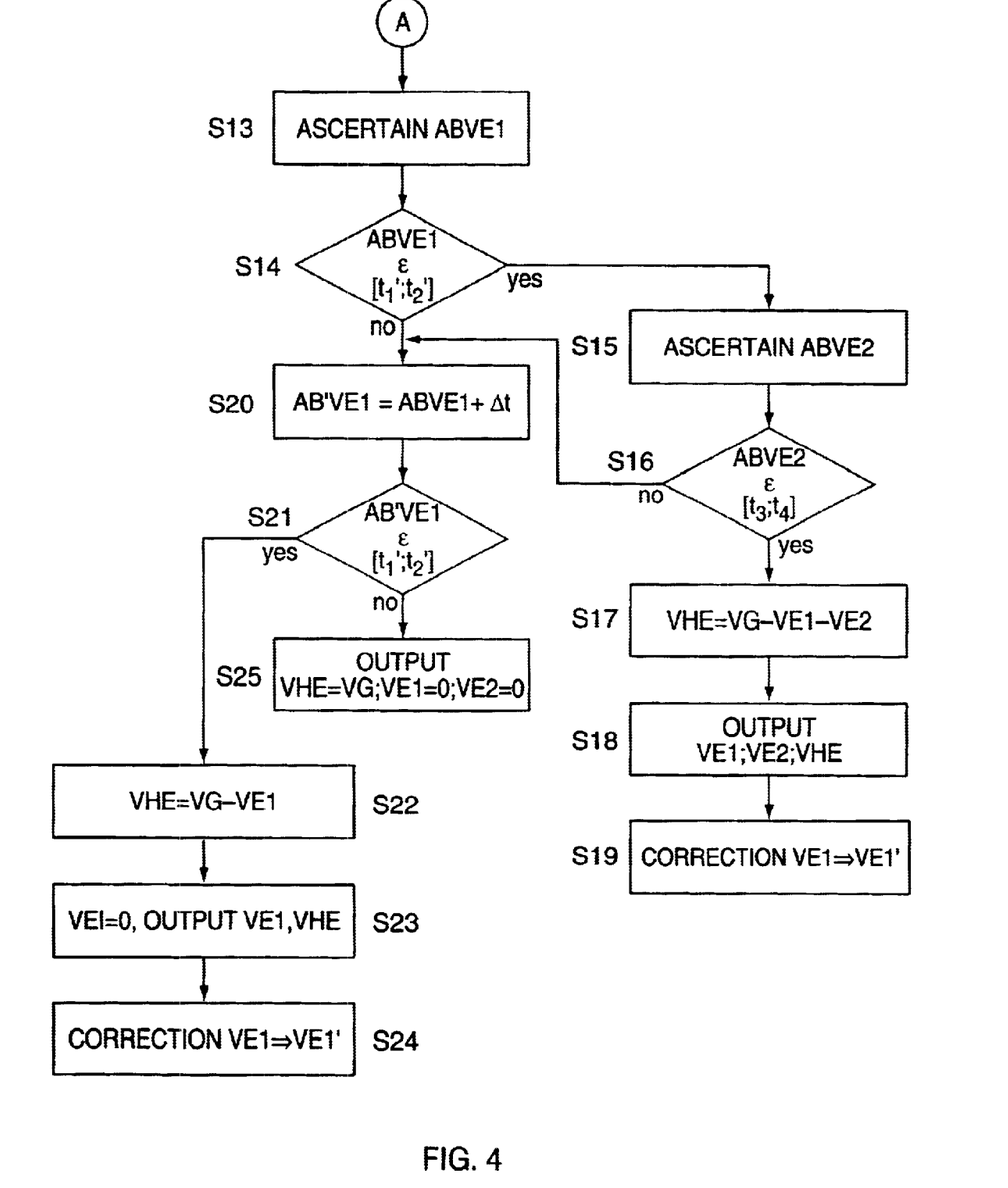

The exemplary embodiment, which is for the functioning method of the device shown in FIGS. 1 and 2, and is described with reference to FIGS. 3 and 4, is cyclically implemented for each cylinder in each combustion cycle.

The method described in FIGS. 3 and 4 advantageously avoids double calculations or a multiple calculation of the individual fuel amounts for first pre-injection E1, second pre-injection E2, and main injection HE, since all fuel amounts are determined as a function of each other, in the order (VG−VE1)−VE2=VHE. In addition, first pre-injection E1 has priority over second pre-injection E2. This means that, in all possible cases, first pre-injection E1 is determined and stipulated, and it is only then checked if second pre-injection E2 is possible, given the second fuel amount. This is particularly advantageous in connection with smooth-running regulator correction device 8, which carries out a smooth-running regulator correction of first fuel amount VE1, since, of the two pre-injections E1 and E2, the pre-injection including the smooth-running regulator correction has priority.

What is claimed is:

1. A method for dividing up a total fuel amount (VG), which is to be injected into a combustion chamber of a cylinder during a combustion cycle (Z1), into a plurality of injections (E1, E2, HE), comprising the following steps:

determination of a first fuel amount (VE1), which is to be injected into the combustion chamber of the cylinder during a first injection (E1) of the combustion cycle (Z1);

determination of a fourth, minimum fuel amount (VHEmin) for a third injection (HE) of the combustion cycle (Z1);

comparison of the total fuel amount (VG) minus the first fuel amount (VE1), to the fourth, minimum fuel amount (VHEmin);

setting of the first fuel amount (VE1) and a second fuel amount (VE2), which is to be injected into the combustion chamber of the cylinder during a second injection (VE2) of the combustion cycle (Z1), to zero; setting of a third fuel amount (VHE) for the third injection (HE) to the total fuel amount (VG), when the total fuel amount (VG) minus the first fuel amount (VE1) is greater than or equal to the fourth, minimum fuel amount (VHEmin); and use of the third fuel amount (VHE=VG);

the first injection (E1) occurring prior to the second injection (E2), which occurs prior to the third injection (HE).

2. The method as recited in claim 1, characterized by the following steps:

determination of the second fuel amount (VE2), which is to be injected into the combustion chamber of the cylinder during a second injection (E2) of the combustion cycle (Z1);

comparison of the total fuel amount (VG) minus the first fuel amount (VE1), and minus the second fuel amount (VE2), to the fourth, minimum fuel amount (VHEmin);

setting of the second fuel amount (VE2) to zero; setting of a third fuel amount (VHE), which is to be injected into the combustion chamber of the cylinder during the third injection (HE) of the combustion cycle (Z1), to the total fuel amount (VG) minus the first fuel amount (VE1), when the total fuel amount (VG) minus the first fuel amount (VE1), and minus the second fuel amount (VE2), is greater than or equal to the fourth, minimum fuel amount (VHEmin); and use of the first fuel amount (VE1=VE1) and the third fuel amount (VHE=VG−VE1).

3. The method as recited in claim 2, characterized by the following step:

setting of the third fuel amount (VHE) to the total fuel amount (VG) minus the first fuel amount (VE1), and minus the second fuel amount (VE2).

4. The method as recited in claim 3, characterized by the following steps:

determination of a first position (AB E1) for the first injection (E1);

checking if the first position is within first limiting values ($[t_1, t_2]$);

determination of a second position (AB E2) for the second injection (E2);

checking if the second position (AB E2) is within second limiting values ($[t_3, t_4]$); and application of the first fuel amount (VE1) to the first injection (E1), application of the second fuel amount (VE2) to the second injection (E2), and application of the third fuel amount (VHE) to the third injection (HE).

5. The method as recited in claim 4, wherein the following steps are implemented when the first position (AB E1) is not within the first limiting values ($[t_1, t_2]$) or the second position (AB E2) is not within the second limiting values ($[t_3, t_4]$):

setting of the second fuel amount (VE2) for the second injection (E2) to zero;

determination of a third position (AB'E1) for the first injection (E1);

checking if the third position (AB'E1) is within third limiting values ($[t_{1'}, t_{2'}]$); and setting of the first fuel amount (VE1) for the first injection (E1) to zero; setting of the third fuel amount (VHE) for the third injection (HE) to the total fuel amount (VG), when the third position (AB'E1) is not within the third limiting values ($[t_{1'}, t_{2'}]$); and use of the third fuel amount (VHE=VG).

6. The method as recited in claim 5, wherein the following steps are implemented, when the third position (AB' E1) is not within the third limiting values ($[t_{1'}, t_{2'}]$):

setting of the third fuel amount (VHE) for the third injection (HE) to the total fuel amount (VG) minus the first fuel amount (VE1); and use of the first fuel amount (VE1) and the third fuel amount (VHE=VG−VE1).

7. A method for dividing up a total fuel amount (VG), which is to be injected into a combustion chamber of a cylinder during a combustion cycle (Z1) and includes a first fuel amount (VE1), a second fuel amount (VE2), and a third fuel amount (VHE), into a first injection (E1), a second injection (E2), and a third injection (HE) of the combustion cycle (Z1) of the cylinder, comprising the following steps:

determination of a first position (AB E1) for the first injection (E1);

checking if the first position is within first limiting values ($[t_1, t_2]$);

determination of a second position (AB E2) for the second injection (E2);

checking if the second position (AB E2) is within second limiting values ($[t_3, t_4]$); and application of the first fuel amount (VEI) to the first injection (E1), application of the second fuel amount (VE2) to the second injection (E2), and application of the third fuel amount (VHE) to the third injection (HE);

wherein the following steps are implemented, when the first position (AB E1) is not within the first limiting values ($[t_1, t_2]$) or the second position (AB E2) is not within the second limiting values ($[t_3, t_4]$);

setting of the second fuel amount (VE2) for the second injection (E2) to zero;

determination of a third position (AB'E1) for the first injection (E1);

checking if the third position (AB'E1) is within third limiting values ($[t_{1'}, t_{2'}]$); and setting of the first fuel amount (VE1) for the first injection (E1) to Zero; setting of the third fuel amount (VHE) for the third injection (HE) to the total fuel amount (VG), when the third position (AB'E1) is not within the third limiting values ($[t_{1'}, t_{2'}]$); and use of the third fuel amount (VHE=VG).

8. The method as recited in claim 7, wherein the following steps are implemented, when the third position (AB' E1) is not within the third limiting values ($[t_{1'}, t_{2'}]$):

setting of the third fuel amount (VHE) for the third injection (HE) to the total fuel amount (VG) minus the first fuel amount (VE1); and use of the first fuel amount (VE1) and the third fuel amount (VHE=VG−VE1).

9. The method as recited in claim 2, wherein the first fuel amount (VE1) is further corrected by a smooth-running regulator correction prior to using the first fuel amount (VE1).

10. The method as recited in claim 2, wherein the first and the second injections (E1 and E2) are pre-injections, and the third injection (HE) is a main injection.

* * * * *

UNITED STATES PATENT AND TRADEMARK OFFICE
CERTIFICATE OF CORRECTION

PATENT NO. : 6,698,396 B2
DATED : March 2, 2004
INVENTOR(S) : Andreas Pfaeffle et al.

It is certified that error appears in the above-identified patent and that said Letters Patent is hereby corrected as shown below:

Column 7,
Line 65, change "In step S1" to -- In Step S11 --

Column 12,
Line 40, change "(E1) to Zero;" to -- (E1) to zero; --

Signed and Sealed this

Twenty-fifth Day of January, 2005

JON W. DUDAS
*Director of the United States Patent and Trademark Office*